United States Patent [19]

Klefbeck

[11] Patent Number: 4,528,554
[45] Date of Patent: Jul. 9, 1985

[54] SIGNAL LIGHT FOR FISHING RODS AND TIP UPS

[76] Inventor: Robert J. Klefbeck, 3 Dresden Ct., Albany, N.Y. 12203

[21] Appl. No.: 417,901

[22] Filed: Nov. 1, 1982

[51] Int. Cl.³ .................... G08B 21/00; A01K 97/00
[52] U.S. Cl. ........................................ 340/573; 43/16; 43/17
[58] Field of Search ..................... 340/573; 43/16, 17

[56] References Cited

U.S. PATENT DOCUMENTS

| | | | |
|---|---|---|---|
| 2,619,559 | 11/1952 | Schenkel | 340/573 |
| 2,671,209 | 3/1954 | Habib | 340/573 |
| 2,699,465 | 1/1955 | Hamilton | 340/573 |
| 2,741,054 | 4/1956 | Brundage | 43/17 |
| 2,986,835 | 6/1961 | Ordinetz et al. | 43/17 |
| 3,250,036 | 5/1966 | Wenger | 43/17 |
| 3,868,668 | 2/1975 | Woodbury | 340/573 |
| 4,209,930 | 7/1980 | Boynton | 43/17 |
| 4,266,217 | 5/1981 | Kao et al. | 340/573 |

Primary Examiner—Glen R. Swann, III
Attorney, Agent, or Firm—Heslin, Watts & Rothenberg

[57] ABSTRACT

A signalling device that can be attached to a fishing rod and an ice fishing tip up, to alert the angler to the strike or biting of a fish, by means of an oscilating luminous signal. A cylindrical housing having a removable circuit breaking plug or insert said plug incorporating an attached slotted ring to comfortably retain fishing line and to loop around the flag stem hanger of a tip up. The pressure of a hooked fish removes the plug which completes the circuit thus illuminating the signal.

16 Claims, 3 Drawing Figures

U.S. Patent      Jul. 9, 1985      4,528,554
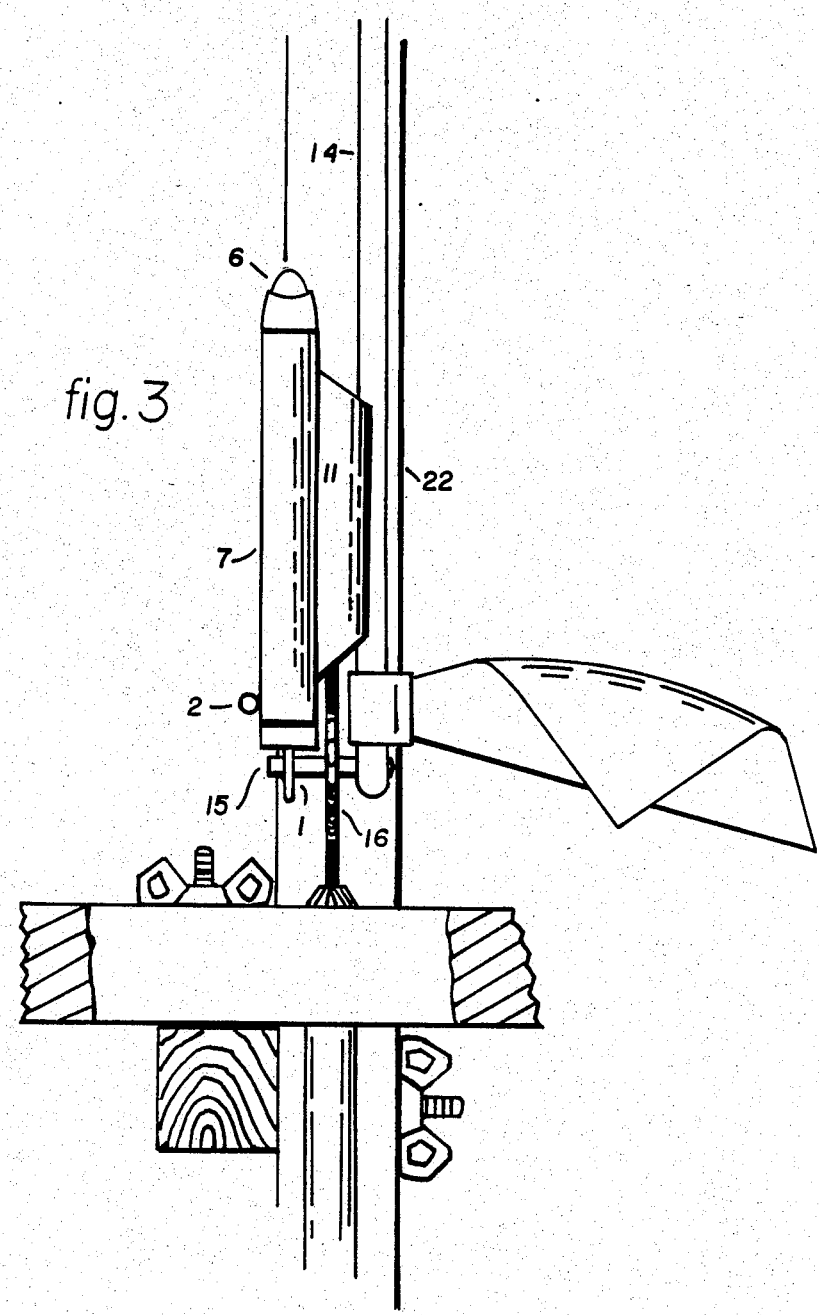
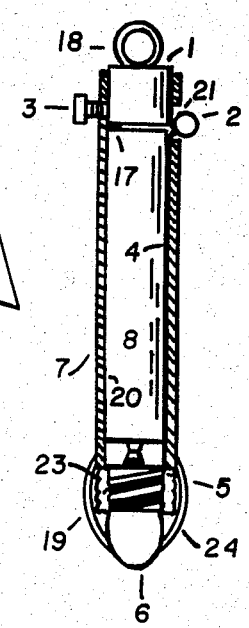
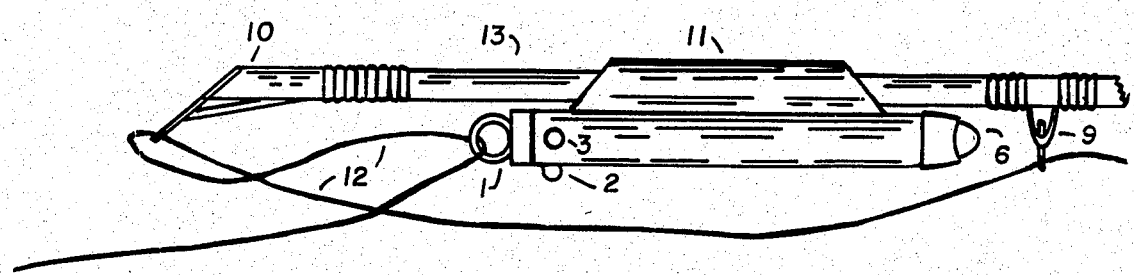

SIGNAL LIGHT FOR FISHING RODS AND TIP UPS

BACKGROUND OF THE INVENTION

The present invention relates to a signal device for fishing rods and ice fishing tip ups that alerts the angler to a biting fish by means of a waving or oscilating luminous signal, to help relieve some of the common frustrations of year round night fishing.

BACKGROUND ART

Many devices have been proposed for providing a visual indication of a hooked fish, although some important considerations seem not to have been examined and placed in this art. One problem that is solved by the present invention is that of the injuring of the fishing line through the use of clamps and pinching devices incorporated in prior arts, for example, the D. A. Wenger U.S. Pat. No. 3,250,036 the W. Ordinetz U.S. Pat. No. 2,986,835 the Dia-Hae Kao U.S. Pat. No. 4,266,217 and the Greg Boynton U.S. Pat. No. 4,209,930. The present invention when placed between the final two eyes of the fishing rod, accepts the fishing line after the threading of the last eye by simply passing the line through the ring of the slotted ring plug, resulting in a stressless holding of the fishing line. A second problem solved by the present invention is one of the locating of the water surface junction with the fishing line in relation to the rod tip. The said location is important so as to set the hook at a proper angle. The said location is found by means of the brightly colored ring plug sliding down the fishing line and floating on the surface at said point. A third problem solved by the present invention is one of giving the user of an ice fishing tip up and the user of a common fishing rod an oscilating signal light as opposed to a stationary illumination provided by prior arts. This is accomplished by its functional design use at the oscilating extremities of a fishing rod and the flag stem of an ice fishing tip up.

SUMMARY OF THE INVENTION

A signal light for fishing rods and ice fishing tip ups according to the present invention comprises: a cylindrical housing supporting a removable insert or plug at an end the other or opposite extremity accomodating a miniature electrical lamp, said lamp is secured in place by means of interior threading of said cylindrical housing, said insert or plug is contained by conforming to interior dimensions of the cylindrical housing. The interior route between the lamp and the said plug or insert is used by a power source or battery resting on its length and achieving a positive electrical contact with the said lamp. The majority of the remaining volume is used by a protrusion placed radial to the interior curve of the cylindrical housing and located at the negative end of the said power source. The protrusion is used to maintain the location of the battery within the housing in respect to the lamp and its to be said negative contact, said negative contact is a circular washer like configuration including a stem of a spring steel composition, said stem is positioned with an extremity in contact with the negative casing of the afore said lamp, thence running along the interior wall of the cylindrical housing and parallel to the said power source and resting with its washer like extremity positioned on its edge and in contact with afore said removable plug or insert, while the plug maintains its position at the interior of the cylindrical housing, pressure is applied to the washer like extremity of the negative contact, thus it is forced through a slot or window in the housing thereby avoiding contact with the negative end of the power source, resulting in an incomplete circuit. A complete circuit is achieved upon removal of the slotted ring plug, allowing the negative contact's washer like extremity to communicate with the negative end of the battery or power source, thus illuminating the signal. The said slotted ring is used to compfortably retain the fishing line, upon the strike or biting of a fish the slotted ring plug is removed from the cylindrical housing and slides down the fishing line and serves as a line locater. When used on an ice fishing tip up, the entire unit is placed on the flag end of the flag stem, the ring of the ring plug is positioned over and around the flag hanger pin and behind or to the left of the trigger arm, at this point the flag stem is hung on the flag hanger as commonly done, upon the strike or biting of a fish the flag stem is then forced off its hanger, thus leaving the slotted ring plug on the flag hanger, resulting in a complete circuit and an oscilating signal light. The signal light rides the flag stem to its common vertical position. An important object of the present invention is to provide an oscilating luminous signal to make aware the angler of a strike or biting of a fish.

This and other objects, features and advantages of the present invention will become more apparent in the following description of a preferred embodiment with reference to the accompanying drawings, in which

BRIEF DESCRIPTION OF THE DRAWINGS

FIG. 1 is a longitudinal cross section view of the present invention.

FIG. 2 is a side elevation view, illustrating a fragmentary end portion of a fishing rod and the proper use of the present invention therein.

FIG. 3 is a front view of the present invention in its proper positioning when used on an ice fishing tip up.

DETAILED DESCRIPTION OF THE PREFERRED EMBODIMENT

Referring to FIG. 1 the present signalling device comprises a cylindrical housing denoted by numeral (7) of an non-conductive material. One end of housing terminates in a removable plug type insert (1) extending into the interior of the housing. The insert or plug is provided with a slotted ring (18) which can be forced open to introduce fishing line. The opposite end of housing incorporates interior threading (19) to receive bulb or miniature lamp, (6) connecting or making contact with the lamp and resting within the majority of the interior volume of the cylindrical housing is a power source or battery (8) restricted from movement at its negative extremity or end by a radial arm (17) protruding inwardly. The battery is secured at its positive end by the rotating of the bulb in a clock-wise direction within its provided threading (19) of the housing (7), also existing within the housing's interior is a negative contact arm (4) said arm running along the interior wall of the said housing, beginning at the negative casing of the bulb (5) and terminating with its washer like extremity (2) positioned on its edge and in contact with afore said removable insert or plug, said negative contact arm (4) is situated parallel to the said battery (8) and insulated by the non-conductive interior wall of the housing (20) and the battery's paper wrapping. The said washer like extremity of the spring steel composed negative contact arm (2) is forced through a slot or window like penetration in the cylindrical housing (7) by the insertion of the slotted ring plug (1) thereby avoiding electrical communication with the negative extremity of the battery, resulting in an incomplete electrical circuit. A second and final penetration of the cylindrical housing (7) is a small threaded hole to accomodate a corresponding threaded thumb screw (3). The thumb screw extends through the housing (7) wall to apply pressure to the slotted ring plug (1) thus controlling the tension required to remove the slotted ring end plug. The exterior of the cylindrical housing includes threading (23) at the blub end of the housing to receive a corresponding threaded protective bulb cap. (24) Referring to FIGS. 1 and 2 the fishing line (12) shown in FIG. 2 is threaded through the eyes of the fishing rod in the usual manner and cast into the water, the present invention is snapped on the fishing rod by means of a plastic tension clamp (11) and situated between the final two eyes of the fishing rod (9) & (10), a portion of the fishing line located between the final eye (10) and the water is grasped and slipped through the slotted ring plug (1) at this point the common breaking system of the fishing reel is engaged or as an option a full rotation of the slotted ring plug (1) within the cylindrical housing (7) may be performed to disallow the easy flow of the fishing line (12) through the slotted ring plug (1) thus upon the tension applyed to the fishing line (12) by a hooked fish, the ring plug (1) is removed and rides down the fishing line to locate the water surface and fishing line junction by floating at said location. Referring to FIG. 1 upon the removal of the slotted ring plug (1) the tension applied to the washer like tip (2) of the negative contact arm (4) is relaxed thus allowing an electrical communication between the washer like tip or extremity of the negative contact arm and the negative end of the power source or battery. Resulting in a complete electrical circuit thus an illumination of the bulb (6). Referring to FIG. 3 although not identical to FIG. 3, the basic mechanics related to the function of an ice fishing tip up may be understood with the help of the A. P. Brundage U.S. Pat. No. 2,741,054 awarded Apr. 10, 1956, which patent is incorporated by reference herein. Referring to FIG. 3 the reel activated trigger arm (16) when pushed to the right will rotate to lay flat or parallel with the upright (22) thus allowing the hanger pin (15) to become completely exposed or accessible. The present invention is clamped to the flag stem (14) by means of clamp (11), the ring (18) of the slotted ring plug (1) may then be placed over and around the hanger pin (15) at this point the reel activated trigger arm (16) in pushed back to the left to its shown centerline position over the hanger pin (15), the flag stem (14) is then hung on the hanger pin (15), upon the strike or bite of a fish, the reel activated trigger arm (16) is put in motion to the right, forceing the flag stem (14) off the hanger pin (15), resulting in the retaining of the slotted ring plug (1) by the hanger pin (15) while the remaining portion of the present invention rides the flag 180 degrees to its vertical position and illuminating the bulb by removal of the slotted ring plug.

A signalling device for attaching to a fishing rod or an ice fishing tip up to provide a oscilating luminous signal when a fish exerts a pull on the line said signaling device comprising a flashlight embodying a plastic case provided a illuminable lamp, a dry cell in said case communicating with said bulb said case having at one end a removeable plug including an attached slotted ring to retain fishing line in a harmless manner and to loop over the flag hanger of a tip up, also having an electrical contact element (arm) electrically communicating with the bulb, a battery and cooperating with said removeable slotted ring plug said battery having no confluence with said electrical contact element while removeable plug is within its inserted position within the said plastic case said plug when removed by the bitting of a fish, allows said electrical contact element to electrically communicate with the negative extremity of said battery, resulting in a oscilating luminous signal, said removeable slotted ring plug having an additional function as a floating line finder, at the water surface, when used on a fishing rod.

Having thus described this novel invention, what is claimed is:

1. A signal light for attachment to a fishing rod or tip-up, comprising:
   an elongated housing having an opening at each end;
   a light bulb for indicating the presence of a hooked fish, the light bulb residing at one end of the housing;
   means located within said housing for powering the light bulb;
   electrical circuit means for providing an interruptible electrical circuit between the powering means and the light bulb;
   a plug removably inserted into the end of the housing opposite from that in which the light bulb resides, such that insertion of the plug into the housing causes an interruption in said electrical circuit, and removal of the plug from the housing results in a completion of said electrical circuit, energizing the light bulb; and
   means for removing the plug from the housing when a fish is hooked.

2. A signal light as recited in claim 1, wherein the electrical circuit means comprises:
   spring loaded electrical contact means disengaged from said powering means by the inserted plug.

3. A signal light as recited in claim 1, wherein the electrical circuit means comprises:
   a threaded, electrically conductive bulb socket residing at said one end of the housing, into which is threaded the light bulb;
   an electrically conductive arm contacting the bulb socket and running substantially the length of the housing;
   spring biased contact means on the end of the conductive arm opposite to the end contacting the socket bulb, said contact means being biased to electrically engage the powering means, such that insertion of the plug into the housing forces the contact means away from the powering means, interrupting electrical contact, and removal of the plug from the housing permits the contact means to return to electrical contact with the powering means.

4. A signal light as recited in claim 3 wherein said housing is provided with a slot for accommodating movement of the contact means when the plug is inserted in the housing, and wherein the contact means is self biased due to the composition of the conductive arm.

5. A signal light as recited in claim 1, further comprising:

means for attaching the housing to the fishing rod or tip-up.

6. A signal light as recited in claim 5, wherein the means for removing the plug comprises:
a ring attached to the plug, the ring being external to the housing when the plug is inserted into the housing, the ring having a central opening for receiving fishing line, so that when a fish is hooked the plug will be removed from the housing by the action of the fish on the fishing line.

7. A signal light as recited in claim 6, wherein the ring is slotted for passing the fishing line through the ring and into said central opening.

8. A signal light as recited in claim 7, wherein:
the ring is brightly colored and the plug floats in water, so that upon removal of the plug from the housing the plug slides down the fishing line and serves to indicate the intersection of the fishing line and the water.

9. A signal light as recited in claim 8, wherein the means for attaching the signal light to the fishing rod further comprises:
means attaching the signal light to the fishing rod between the final two eyelets on the end of the fishing rod, so that oscillations of the fishing rod due to a hooked fish, also oscillate the signal light.

10. A signal light as recited in claim 9, further comprising:
means for adjusting the force required to remove the plug from the housing.

11. A signal light as recited in claim 10, wherein the housing is electrically nonconducting, and the powering means comprises:
a battery located within the housing.

12. A signal light as recited in claim 11, wherein the housing is cylindrical, and the light bulb is a flashlight bulb.

13. A signal light as recited in claim 5, for attachment to a tip-up, wherein the means for attaching the housing to the tip-up, comprises:
means for attaching the housing to a flag stem of said tip-up; and
wherein the means for removing the plug comprises:
a ring attached to the plug, the ring being external to the housing when the plug is inserted into the housing, the ring having a central opening for receiving a hanger pin of said tip-up therein, whereby a hooked fish will cause the flag stem to rotate away from the hanger pin, simultaneously removing the plug from the housing.

14. A signal light as recited in claim 13 further comprising:
means for adjusting the force required to remove the plug from the housing.

15. A signal light as recited in claim 14, wherein the housing is electrically nonconducting, and the powering means comprises:
a battery located within the housing.

16. A signal light as recited in claim 15, wherein the housing is cylindrical, and the light bulb is a flashlight bulb.

* * * * *